(12) United States Patent
Demmeler

(10) Patent No.: US 9,303,674 B2
(45) Date of Patent: Apr. 5, 2016

(54) BOLT AND CLAMPING SYSTEM USING BOLTS

(76) Inventor: Ludwig Demmeler, Boos (DE)

( * ) Notice: Subject to any disclaimer, the term of this patent is extended or adjusted under 35 U.S.C. 154(b) by 262 days.

(21) Appl. No.: 13/703,159

(22) PCT Filed: May 7, 2012

(86) PCT No.: PCT/EP2012/058371
§ 371 (c)(1),
(2), (4) Date: Aug. 5, 2013

(87) PCT Pub. No.: WO2012/152755
PCT Pub. Date: Nov. 15, 2012

(65) Prior Publication Data
US 2014/0056668 A1 Feb. 27, 2014

(30) Foreign Application Priority Data

May 10, 2011 (DE) .......................... 10 2011 101 096

(51) Int. Cl.
| | |
|---|---|
| *F16B 21/18* | (2006.01) |
| *F16B 21/16* | (2006.01) |
| *F16B 19/10* | (2006.01) |
| *F16B 5/06* | (2006.01) |

(52) U.S. Cl.
CPC ............... *F16B 21/18* (2013.01); *F16B 19/109* (2013.01); *F16B 21/165* (2013.01); *F16B 5/0642* (2013.01)

(58) Field of Classification Search
CPC ...... F16B 19/109; F16B 21/18; F16B 21/183; F16B 21/165
USPC ................................... 411/348, 353, 354, 549
See application file for complete search history.

(56) References Cited

U.S. PATENT DOCUMENTS 3,498,653 A * 3/1970 McCreery ................... 403/322.2
3,608,937 A * 9/1971 Nave .............................. 403/57
(Continued)

FOREIGN PATENT DOCUMENTS

CN 101076675 A 11/2007
CN 101255885 A 9/2008
(Continued)

OTHER PUBLICATIONS

International Search Report issued in International Patent Application No. PCT/EP2012/058371 dated Jul. 18, 2012.
(Continued)

*Primary Examiner* — Roberta Delisle
(74) *Attorney, Agent, or Firm* — Oliff PLC

(57) ABSTRACT

A bolt for the detachable connection of two component parts provided with at least one through-hole and a clamping system serving for detachably, rapidly and reliably interconnecting objects provided with through-holes. A plug-in pin includes a bolt housing having through-openings; a clip means supported in the through-openings; and a clamping device arranged in the housing's interior and provided with an external thread, which meshes with an internal thread of the housing and during clamping, forces the clip means out of the housing such that an outer portion of the clip means protrudes from the through-openings. The clip means is made at least as one sliding element supported in the bolt housing in a rotationally fixed fashion and the sliding element's outer portion has a support surface in the form of a lateral area segment of a truncated cone or an annular support surface.

13 Claims, 13 Drawing Sheets

(56) References Cited

U.S. PATENT DOCUMENTS

| | | | |
|---|---|---|---|
| 4,278,120 A * | 7/1981 | Hart et al. | 411/190 |
| 4,863,205 A | 9/1989 | Schron et al. | |
| 5,318,284 A | 6/1994 | Demmeler et al. | |
| 5,480,108 A | 1/1996 | Amiand et al. | |
| 5,803,689 A * | 9/1998 | Magnus et al. | 411/355 |
| 7,377,137 B1 * | 5/2008 | Bednarz | 70/34 |
| 8,549,724 B2 * | 10/2013 | Davies | 29/525.01 |
| 8,720,874 B2 * | 5/2014 | Tschida et al. | 269/48.1 |
| 2008/0193212 A1 | 8/2008 | Kaufman | |
| 2008/0212293 A1 | 9/2008 | Li et al. | |

FOREIGN PATENT DOCUMENTS

| | | |
|---|---|---|
| DE | 197 27 099 A1 | 2/1999 |
| DE | 197 34 866 C1 | 2/1999 |
| DE | 199 17 209 A1 | 11/2000 |
| DE | 201 04 105 U1 | 8/2001 |
| DE | 10 2008 064 052 A1 | 7/2010 |
| EP | 0 647 496 A2 | 4/1995 |
| JP | S47-14846 B | 5/1972 |
| JP | S50-32468 U | 4/1975 |
| JP | S61-123215 U | 8/1986 |
| WO | WO 2009/111835 A1 | 9/2009 |

OTHER PUBLICATIONS

Written Opinion issued in International Patent Application No. PCT/EP2012/058371 dated Jul. 18, 2012 (with translation).

Partial translation of Feb. 22, 2012 Search Report issued in German Application No. DE 10 2011 101 096.7.

Dec. 8, 2015 Office Action issued in Japanese Patent Application No. 2014-509700.

* cited by examiner

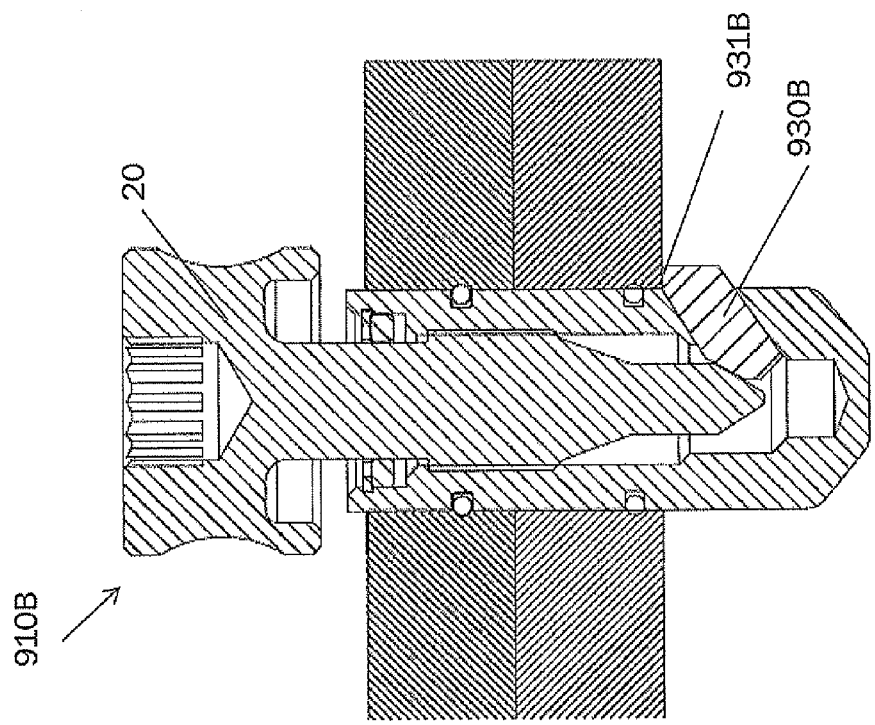
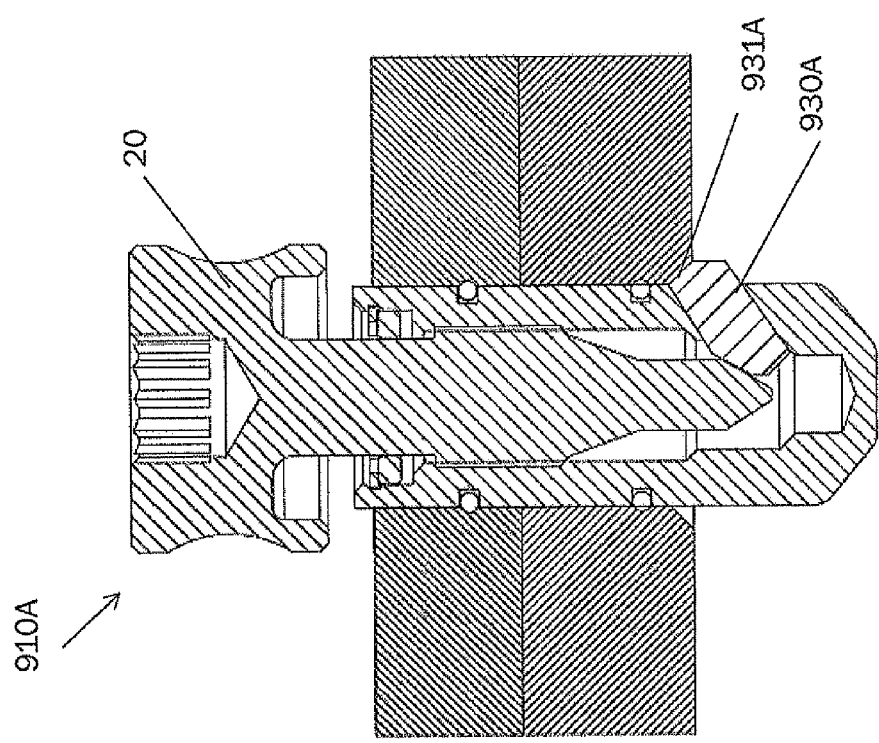

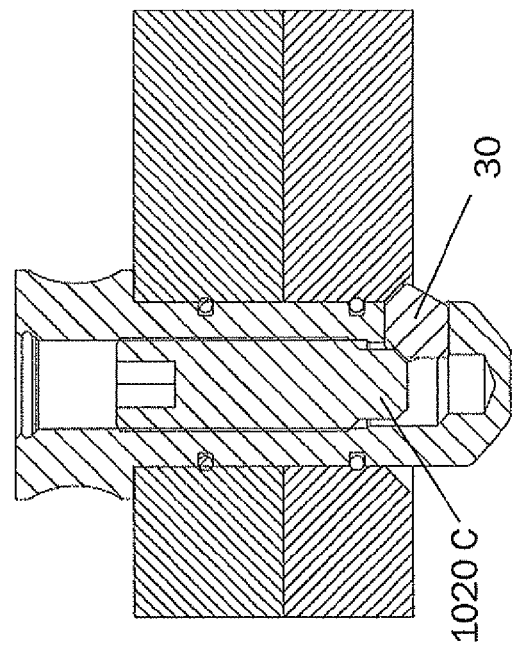
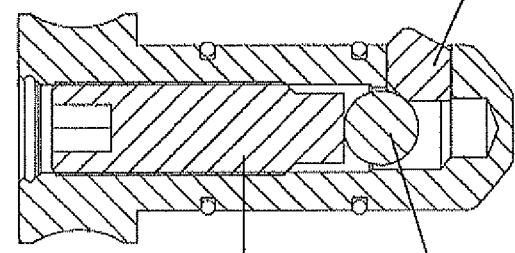
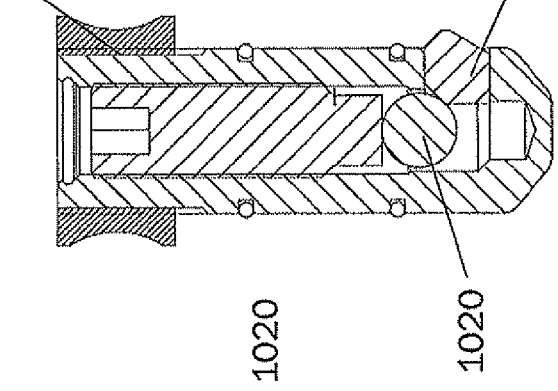

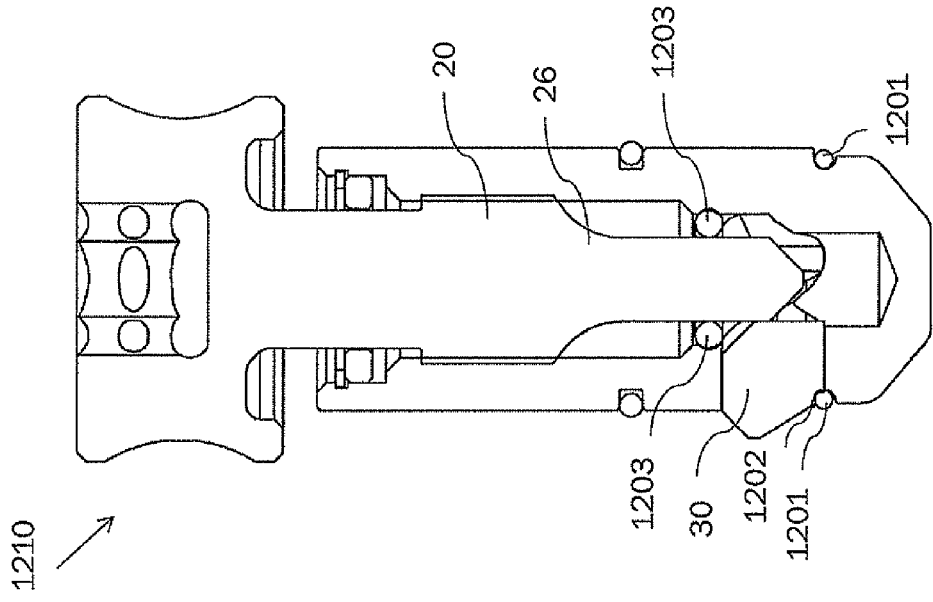
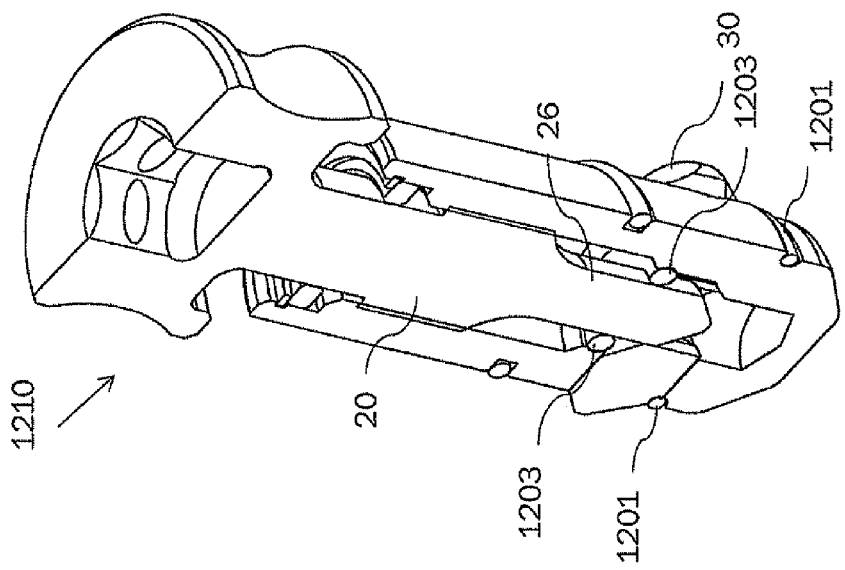
Fig. 12B
Fig. 12A

BOLT AND CLAMPING SYSTEM USING BOLTS

The invention relates to a bolt for the detachable connection of two component parts provided with at least one through-hole. The invention also relates to a clamping system serving for interconnecting objects provided with through-holes in a detachable, fast and reliable way. A further aspect of the invention concerns a method for locking and unlocking a clamp bolt by means of a tool for torque transmission.

Bolts of this type are known in the art. For example, EP 0 647 496 A2 and DE 201 04 105 U1 disclose a bolt of this type. Such bolts have proved their worth as a flexible, detachable clamping device and in particular have the advantage that the clamping mechanism which is based on balls and radial bores can be produced well. High clamping and tensile forces can be realized by means of bolts of this type. However, it has been found that these clamping and tensile forces deform the material of component parts which are repeatedly clamped using these bolts over a prolonged period of time, in particular at the through-holes serving for accommodating the bolts and clamping tubes, thus making them unusable.

Therefore, it is an object of the present invention to further develop the clamp bolts known from the prior art to reduce or avoid such deformations of the material.

This object is achieved by a bolt according to the features of claim 1 and by a clamping system according to the features of claim 10. The dependent claims relate to advantageous embodiments of the invention.

The invention concerns a bolt, in particular a plug-in bolt or clamp bolt for the detachable connection and clamping of two component parts or objects which are provided with at least one through-hole. According to the invention, the bolt comprises a bolt housing which is provided with through-openings for clip means that are supported in the through-openings of the bolt housing. Here, the clip means are disposed inside the bolt housing while the bolt is not clamped and an outer portion thereof protrudes from the through-openings when the bolt is clamped. The clip means are supported with minor clearance in the through-openings, and therefore it is also possible for the clip means to partially protrude from the through-openings in the unclamped state as well, e.g. due to a movement of the bolt. Furthermore, the bolt comprises a clamping device which is arranged in the bolt housing interior and is provided with an external thread, e.g. a spindle or a stud, the external thread of which meshes with an internal thread of the bolt housing. Here, a first end region of the clamping device can protrude from the bolt housing where it is provided with a hand grip in a preferably rotationally fixed fashion. However, the end region of the clamping device can also be disposed within the bolt housing, e.g. in the form of a stud which can be clamped by means of an Allen wrench. The clamping devices are forced out of the bolt housing in a radial direction when the clamping device is screwed in and they preferably abut accurately against the mating surface since the guide clearance is very small.

In order to detachably connect and clamp two component parts or objects which are provided with at least one through-hole, the bolt can then simply be inserted in two through-holes of these component parts, which are aligned in single file and have the shape of a cylinder or an elongated hole. When the clamping device, e.g. the spindle or the spindle hand grip, is turned, the clamping devices are forced out and interlocked behind the through-hole of the lower component part. The spindle hand grip is thus pulled by the threaded spindle against the component part facing the former and both component parts are clamped together so as to create a very firm, absolutely positive-fit clamping apparatus.

In contrast to the bolt known from the prior art, the clip means are not made as balls but as sliding elements which by means of their outer contours form a planar positive fit with respect to the counter-part. In the case of a chamfered through-hole, i.e. of a through-hole having a lateral area segment of a frustoconical depression, the outer portion of a sliding element has a support surface in the form of a lateral area segment of a truncated cone for this purpose. Thus, the outer portion of the sliding element can form a planar positive fit together with a lateral area segment of a frustoconical depression. A lateral area segment within the meaning of this invention can be any segment of a lateral area of a truncated cone. The upper and lower edges of the support surface are preferably formed as parallel circular arc segments. This corresponds to the projection of a trapezoid on the lateral area of a truncated cone. However, the support surface can be shaped in any way as a segment of an envelope of cone and also have non-parallel edges so as to form a planar positive fit having a chamfered bore, i.e. a frustoconical depression.

Alternatively, the outer portion of a sliding element can have an annular support surface if the bolt shall be inserted in through-holes which are not chamfered.

The balls known from the prior art as clip means all only have punctiform or linear contact with a lateral area segment of such a depression. In contrast, a planar positive fit of a support surface of the sliding element having such a depression enables a force distribution which is again much more favorable to thus avoid or exclude the deformations of the material.

In the unclamped state, the sliding elements according to the invention are preferably supported in the through-openings in an anti-twist fashion and with a small clearance. In contrast to the spherical clip means which are known in the art and are not supported in an anti-twist fashion, the advantage here is that a force application via the support surface effects an advantageous clamping of the sliding element and thus a tilting moment. The above mentioned outer portion of the sliding element refers to the sliding element portion which in the clamped state of the bolt protrudes from the bolt housing or to the areas thereof which confine the sliding element to the outer side, i.e. to the side of the through-openings.

On the one hand, the sliding elements according to the invention enable the advantage that the clamping force is not applied to a single point or along a single circular circumferential line (tangents at the balls) as in the case of spherical clip means. As a result, the high clamping forces occurring are distributed more uniformly. The surface force per unit area resulting at the component part to be clamped is reduced and results in a significant reduction in the wear phenomena occurring over a prolonged period of use. On the other hand, an advantageous tilting moment occurs when a force is applied via the contact surfaces of the sliding elements with the component to be clamped, wherein the applied force largely acts on the lower and upper boundary surfaces of the sliding elements and the remaining radial force component is strongly reduced in the direction of the spindle. The resisting force, produced on the lower and upper boundary surfaces when the sliding element is tilted, is advantageously increased by the high frictional forces forming on the lower and upper boundary surfaces while the sliding element preferably only forms a linear contact with the spindle. Furthermore, the relief of the middle spindle, which is due to this tilt and the frictional forces on the lower and upper boundary surfaces, has the advantage that on account of the low friction at the middle spindle the latter can be detached and clamped "sensitively".

The sliding elements can have a polygonal cross-section. Here, the cross-sectional plane is clamped through an axis parallel to the sliding direction (radially outwards) and through the longitudinal axis of the spindle or the bolt housing. The sliding elements, which are also referred to as expansion elements, are preferably formed as a convex polygonal body, wherein a polygonal body is confined within the meaning of this invention by both planar and curved areas.

The sliding elements supported in the through-openings can make an outward movement perpendicular to the longitudinal axis of the bolt. Alternatively, the sliding elements can also be supported in inclined fashion relative to the longitudinal axis of the bolt, and therefore the former can protrude from the bolt housing in inclined fashion during clamping.

The clamping device can also be a spindle having a tapering end region. Furthermore, a tapering end region of the spindle can force the sliding elements out of the bolt housing when the spindle is screwed in.

Alternatively, a ball can be supported in the interior of the bolt housing adjacent to the clamping device, wherein, when the clamping device is screwed in, the clamping force of the clamping device is transmitted to the sliding elements via the ball. In other words, the tip of the clamping device forces the ball supported in the lower end region of the bolt housing downwards when the bolt is clamped, and the ball, in turn, forces the sliding elements outwards and out of the bolt housing. As a result of the punctiform points of attack of the ball, the frictional forces can advantageously be reduced.

The inclined support surface preferably forms an angle ranging from 30° to 60° and more preferably an angle of 35° to 55° or more preferably of 40° to 50° with the longitudinal axis of the spindle. This enables an optimum application and distribution of force on the support surface, which is explained in more detail below by means of the figures.

Furthermore, the sliding element can have a second outer surface extending in inclined fashion relative to the bolt housing, said outer surface forming a more acute angle with the longitudinal axis of the spindle compared to the support surface and having a larger area than the support surface. As a result, the support surface is supported by the second area in optimum fashion and effects a particularly favorable force distribution within the sliding element.

An optimum self-balancing load capacity of the bolt and stability between the expansion elements is achieved by placing three sliding elements in concentric fashion at a distance of about 120° in three polygonal bores. However, the bolt can also be realized with another number of sliding elements, e.g. with two opposite sliding elements or with four or five sliding elements which are arranged concentrically.

Furthermore, the bolt housing can have a circumferential edge or collar at the end thereof where the first end region of the spindle protrudes from the bolt housing. Here, the length of the bolt housing is preferably chosen in such a way that during the insertion in the bore with standardized depth the circumferential edge defines the insertion depth of the bolt in such a manner as to enable immediate clamping and avoid the formerly necessary return stroke and retraction. However, it is also possible to produce the bolt housing without such a collar.

The bolt housing can also have two circumferential grooves which are spaced apart in the longitudinal direction and in each of which a rubber ring or a steel snap-ring is inserted. "Spaced apart" shall mean at least one quarter of the length of the bolt housing. Preferably, these circumferential grooves are arranged in both upper portions and a lower portion of the bolt housing, e.g. the upper circumferential groove having a rubber ring can be arranged at the upper third of the bolt housing and the lower circumferential groove having a rubber ring can be arranged at the lower third of the bolt housing. This enables a better centering of the bolt in the elongated hole and a torque support during clamping as well as a simultaneous removal of dirt, e.g. of welding soot particles, when the bolt is inserted.

The bolt according to the invention can also be inserted in connection with component parts or objects, each having at least one standardized through-opening which has the shape of a circle or of an elongated hole. For example, an M30 internal thread can additionally be incorporated into a D28 system through-hole. The use of clamp bolts having spherical clamping devices is not possible with this type of through-holes having an integrated thread since the punctiform force application leads to high clamping forces and deformations per unit area when balls are used. Due to the clamping devices according to the invention, which can e.g. create a planar positive fit with a lateral area segment of a depression of the through-holes, the clamping forces per unit area are significantly reduced, and therefore a material deformation of the thread notches can reliably be avoided at the end region of the through-holes. Therefore, it is also possible to use difficult clamping jobs for materials having reduced compressive strength, such as aluminum or polyamides.

This invention enables, for the first time, the use of system bores of this type in multiple functions, namely for the optional insertion of a clamp bolt or clamp tube according to the invention and for screwing-in a common threaded rod. Such clamp bolts and system bores are used e.g. in particular in connection with clamping systems on the basis of a work table, also referred to as a finishing table or welding bench, which comprise cylindrical through-holes which are arranged in the table board and along the table edges and directly serve for receiving clamping elements. When this type of through-holes can be employed for use with clamp bolts, clamp tubes and also for screwing-in threaded rods, the flexibility and possible applications of this type of clamping systems are significantly increased.

A clamping system of this type preferably has at least one adapter threaded bush for reducing the thread diameter, said threaded bush being adapted to be screwed into the thread of the through-opening of the component parts. As a result, e.g. a D28 through-hole having an incorporated M30 thread can also be used via suitable adapter bushes as an M24 or M20 thread, etc. This enables the use of system bores of this type in dual function, namely for optionally inserting a clamp bolt according to the invention and screwing-in a common threaded rod.

The bolt according to the invention thus enables new fields of application, e.g. 1. for various clamping jobs on general machine tools; 2. for the heavy-duty machining; 3. in steel structure with major force application by preloading parts to be welded in (compensation); and 4. bracing resulting from the cooling-down of the welding operation. Furthermore, it is possible to simultaneously save an enormous amount of time of operating sequences.

In addition, the invention comprises a method for locking and unlocking a clamp bolt by means of a tool for torque transmission. The method comprises the following steps: The positioning of the tool at the clamp bolt in such a way that the latter meshes in positive fit with an axial recess of the threaded spindle or an axial recess of an outwardly extending hand grip or the like of the threaded spindle, and therefore the tool can transmit a torque to the spindle of the clamp bolt; and the locking or detaching of the bolt by transmitting a torque through the tool. The tool is preferably electrically operated, and therefore the clamp bolt can be locked or detached again rapidly and preferably in a one-hand operation. According to a particularly preferred embodiment, the tool is a percussion drill, and therefore a high torque can rapidly be transmitted.

In summary, the present invention provides a clamp bolt which on account of the sliding elements as clamping devices having a polygonal cross-section or an outer support surface avoids the resulting signs of wear and material deformations at the component parts to be clamped. The sliding element shape according to the invention also results in twisting and interlocking of the sliding elements when a force is applied and thus in a tilting moment which leads major parts of the clamping force away from the spindle tip, thus relieving the latter so as to be detached and clamped "sensitively". Moreover, it is now possible on account of the particularly advantageous force distribution by means of the sliding elements to additionally incorporate an internal thread in the system through-hole and use this internal thread together with a clamp bolt according to the invention without the thread notches being deformed by the high clamping forces. The functional reliability and service life are significantly improved by this new and simple mode of action of all resulting forces and moments.

Preferred embodiments of the present invention are described in more detail below by way of example and in exemplary fashion with reference to the enclosed drawings.

Figure 5:
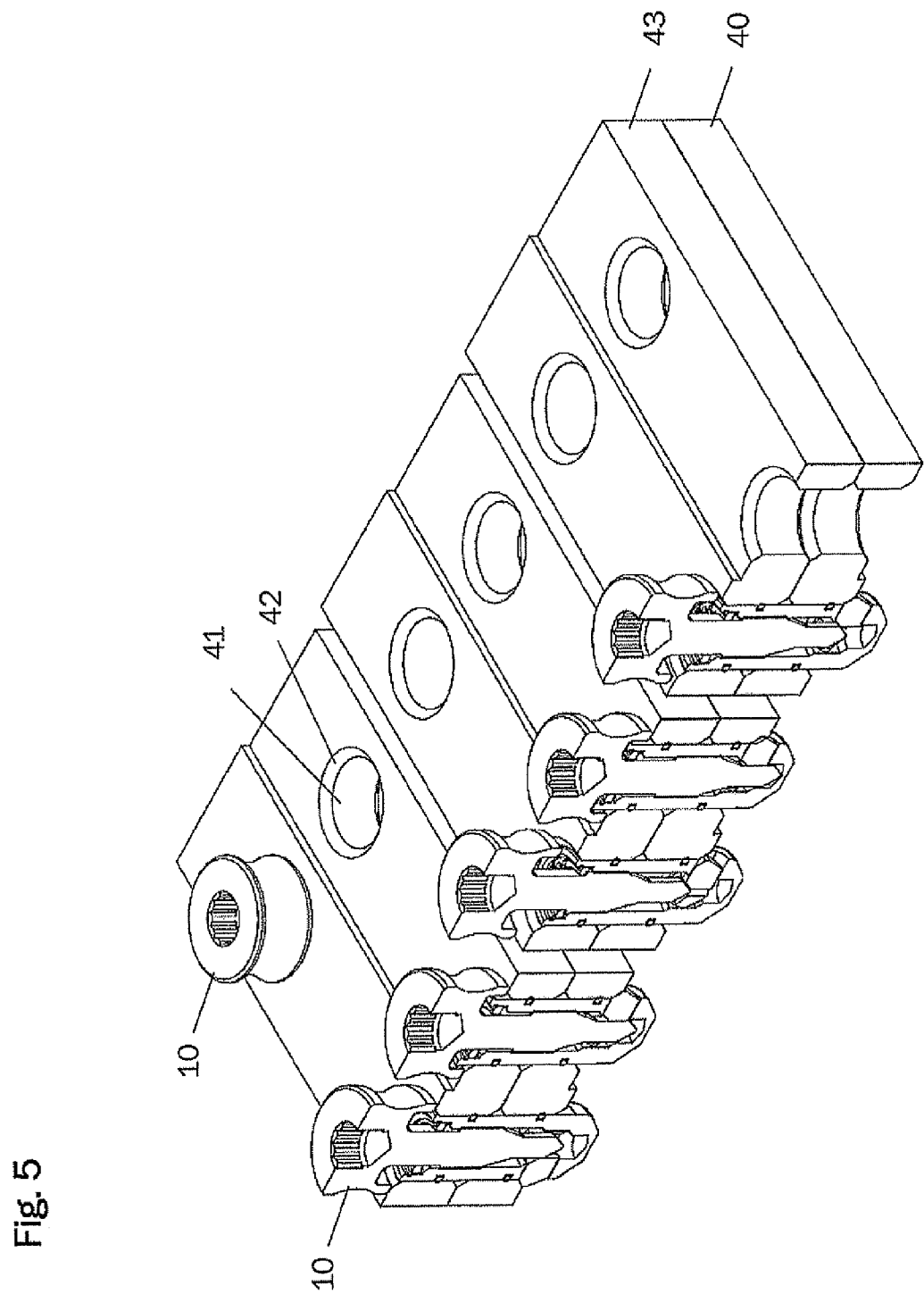
Figure 6:
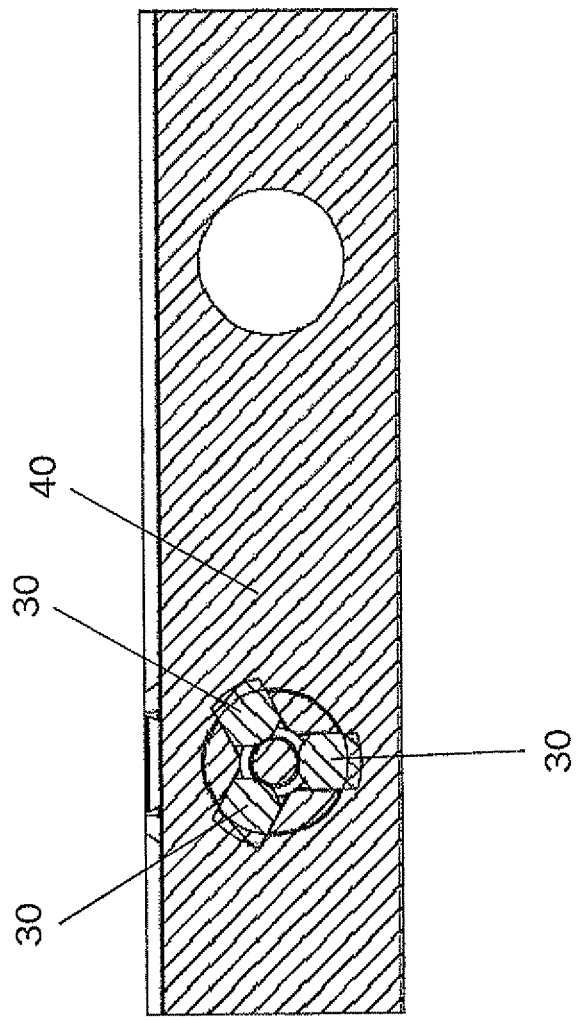
Figure 7B:
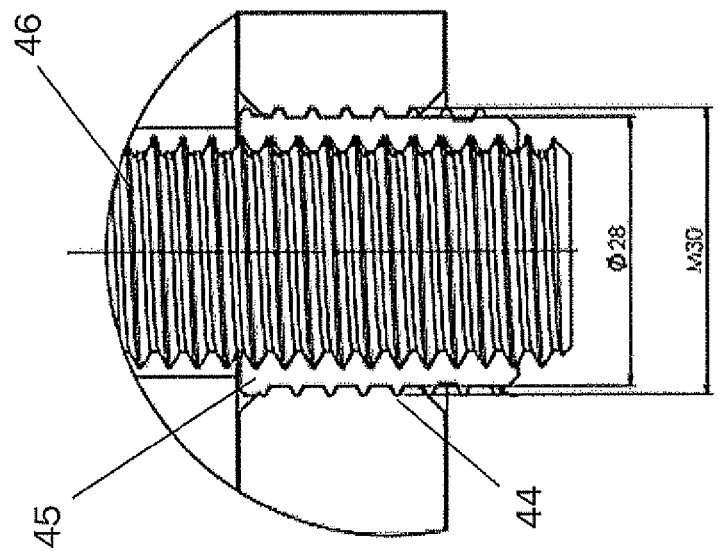
Figure 7A:
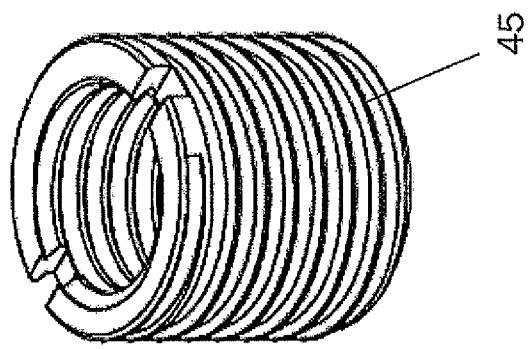
Figure 8:
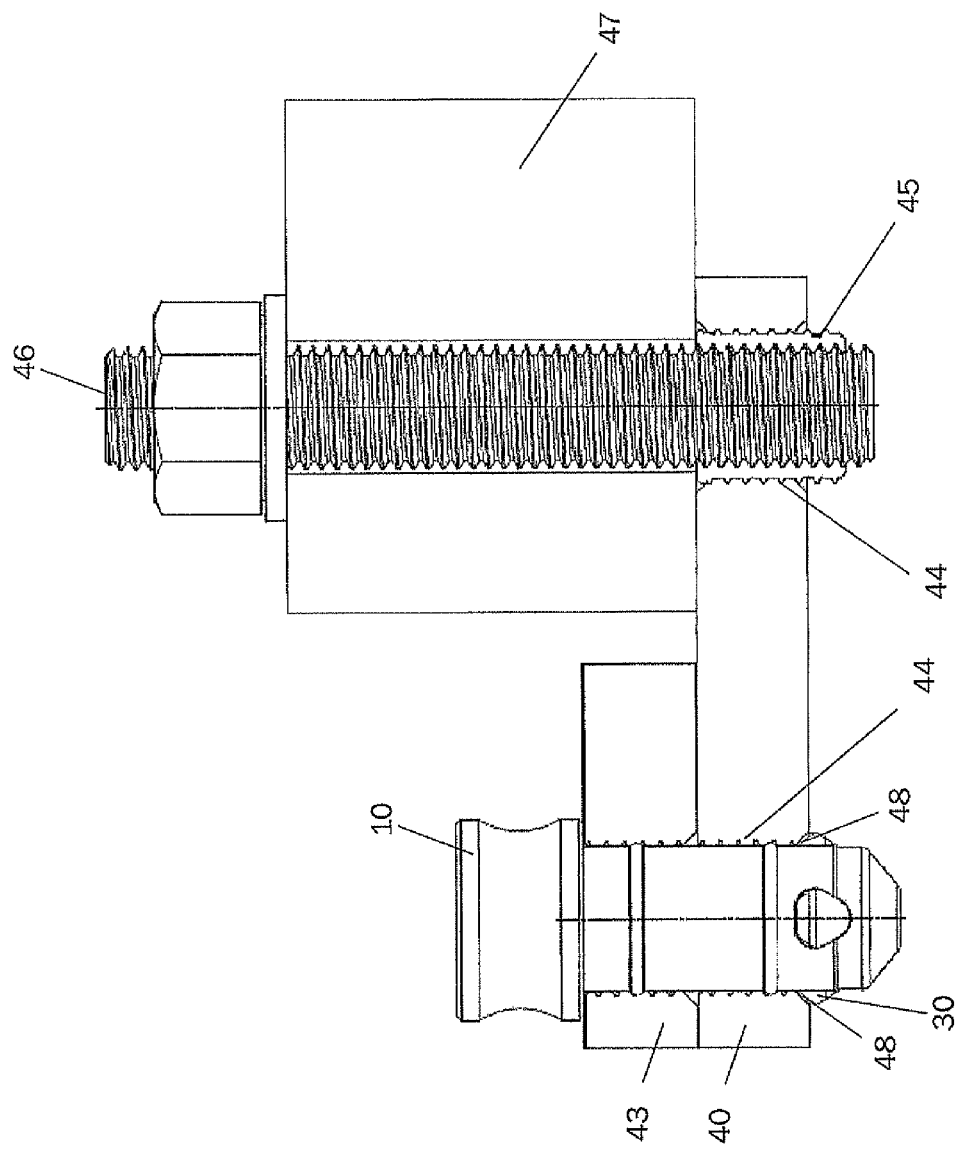
Figure 10B:
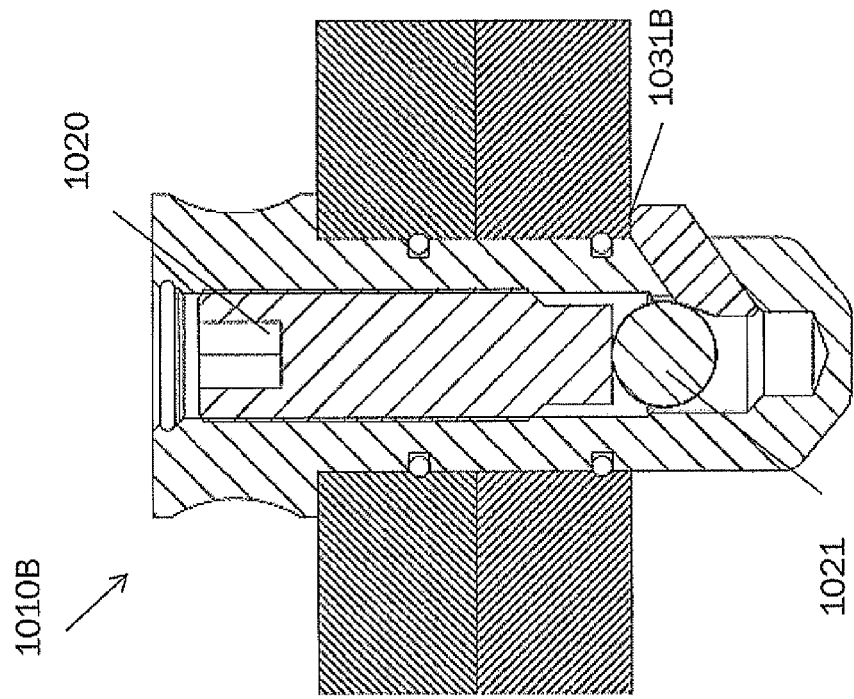
Figure 10A:
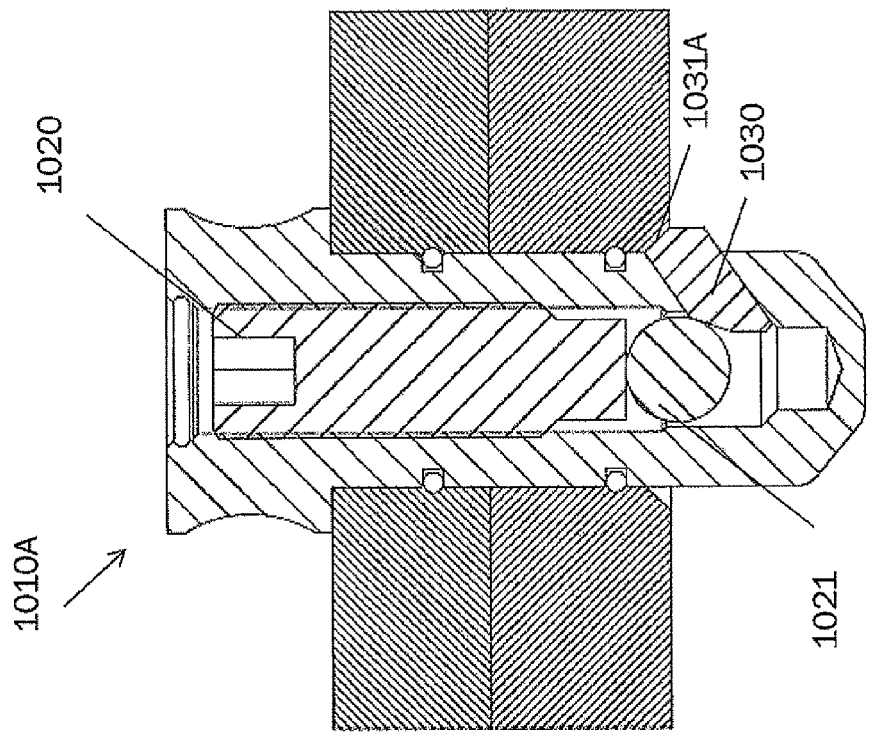

FIG. 5 again illustrates in a perspective sectional view various clamping states according to an exemplary embodiment of the present invention;

FIG. 6 shows a bottom view in the clamped state according to an exemplary embodiment of the present invention;

FIGS. 7A-7B illustrate the use of adapter bushes according to an exemplary embodiment of the present invention;

FIG. 8 illustrates by way of diagram another example using a threaded rod;

FIGS. 9A-9B show sectional views of further exemplary embodiments of the present invention;

FIGS. 10A-10B show sectional views of further exemplary embodiments of the present invention;

FIGS. 11A-11C show sectional views of further exemplary embodiments of the present invention; and FIGS. 12A-12B show sectional views of further exemplary embodiments of the present invention.

Figure 1A:
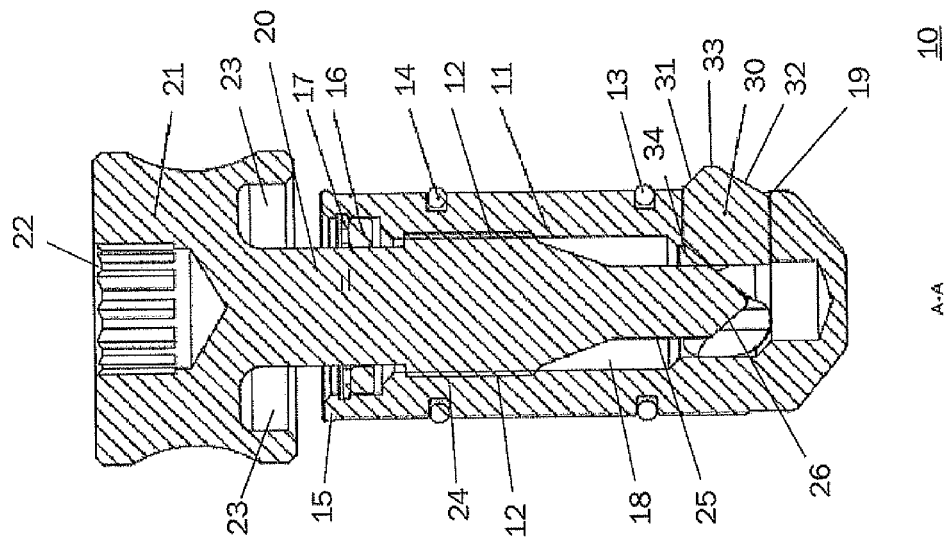
FIGS. 1A-1C show a front view, a sectional view and a perspective view of an embodiment of the present invention.
Figure 1B:
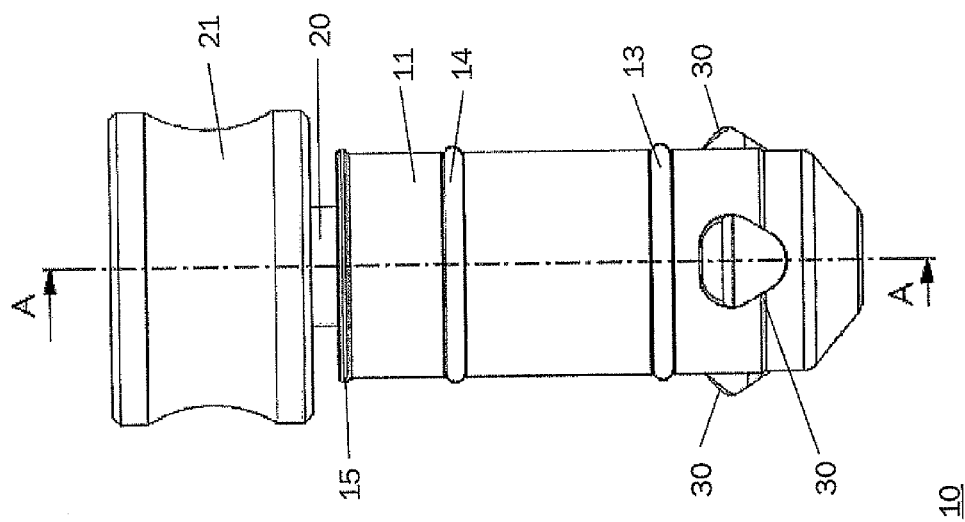
Figure 1C:
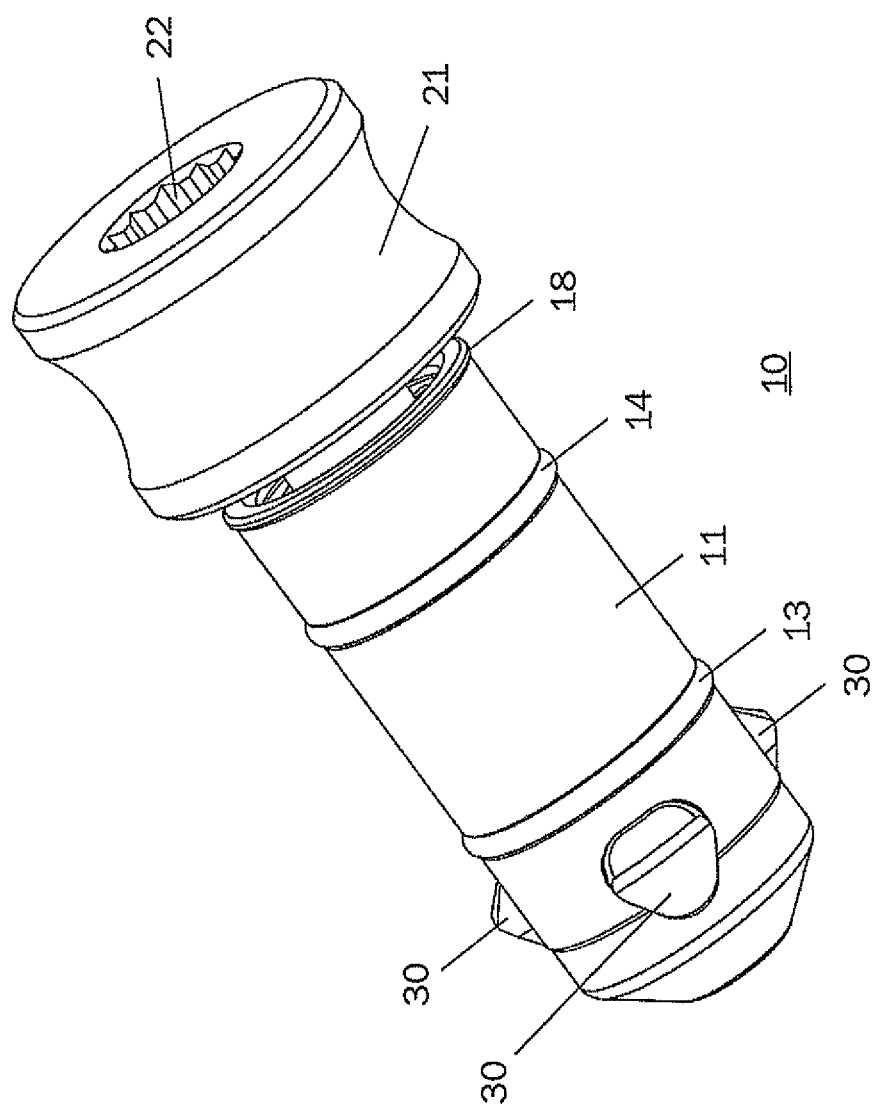

FIGS. 1A, 1B and 1C show an exemplary embodiment of the bolt designated with 10. The bolt has a cylindrical bolt housing 11 which is hollow and open at a front side thereof. The bolt housing 11 is provided with three radial polygonal bores in which the sliding elements 30 are inserted as clamping devices. In the interior of the bolt housing 11 there extends an axial threaded spindle 20 which is connected in rotationally fixed fashion to an outwardly extending hand grip 21 or the like. The circumferential surface of the hand grip 21 is provided with a corrugation (not shown) to increase the grip. In addition, the hand grip 21 is provided with an axial recess 22 which contains both an internal thread and a hexagonal recess. The corners of the hexagonal recess penetrate the thread and therefore an Allen wrench can be inserted in the recess without impairing the thread. Due to the recess 23, the hand grip 21 simultaneously serves as a receiving cap which receives the upper collar 15 in the clamped state.

The spindle has an external thread 24 which meshes with an internal thread 12 of the bolt housing. The spindle 20 also has a tapering end region 25 which in particular in its end portion has another additional arbor-like taper 26, which meshes with the sliding elements 30 and pushes them radially outwards when the bolt 10 is clamped. The bolt 10 has upper and lower circumferential grooves each provided with a rubber ring or a steel snap-ring 13, 14. These rubber rings have a dual function: On the one hand, these rubber rings 13, 14, in particular the lower rubber ring 13, serve for removing dirt, e.g. welding soot. In addition, they serve as torque support to avoid a twist of the bolt 10 in a through-hole when the spindle 20 is actuated. A press sleeve 16 and a safety ring 17 are additionally attached to the upper end of the bolt housing 11. When the spindle 20 is returned, the external thread portion 24 abuts against the O-ring 17 serving as a protection in an extreme case. The spindle can only be fully removed, e.g. to clean the bolt interior, when this O-ring 17 is simultaneously destroyed. Alternatively, the O-ring 17 can also be removed by means of snap ring pliers for cleaning the bolt without destruction.

The sectional view of FIG. 1B shows the polygonal cross-section of the sliding element 30. The sliding element 30 is supported with clearance in the passage of the bolt housing 11, and therefore it is movable in the unclamped state when the bolt is moved and can fully disappear in the bolt housing 11. In contrast to the spherical clamping devices which are known in the art and have a circular cross-section, the cross-section here is polygonal. In this case, individual boundary surfaces can also be slightly curved, such as the boundary surface 34 facing the spindle in the interior. The polygonal cross-section in the outer region of the sliding elements enables a planar positive fit with the clamped component part. The bolt housing 11 is upset at the lower region 19 of the through-openings for the sliding elements 30 to prevent the sliding elements from falling out. The outer region of the sliding element 30 has a contact and/or support surface 31 extending in inclined fashion relative to the bolt housing 11. Below this contact surface 31, the sliding element 30 is confined by a second inclined outer surface which supports the contact surface. A narrow surface section 33 extends therebetween and parallel to the bolt housing 11. The surface section 33 is made as a planar edge (in the form of a cylinder barrel segment) and simultaneously forms the portion of the sliding elements 30, which has maximum distance from the spindle axis. In the clamped state, the upper support surface 34 forms a planar positive fit with the clamped component part.

Figure 2:
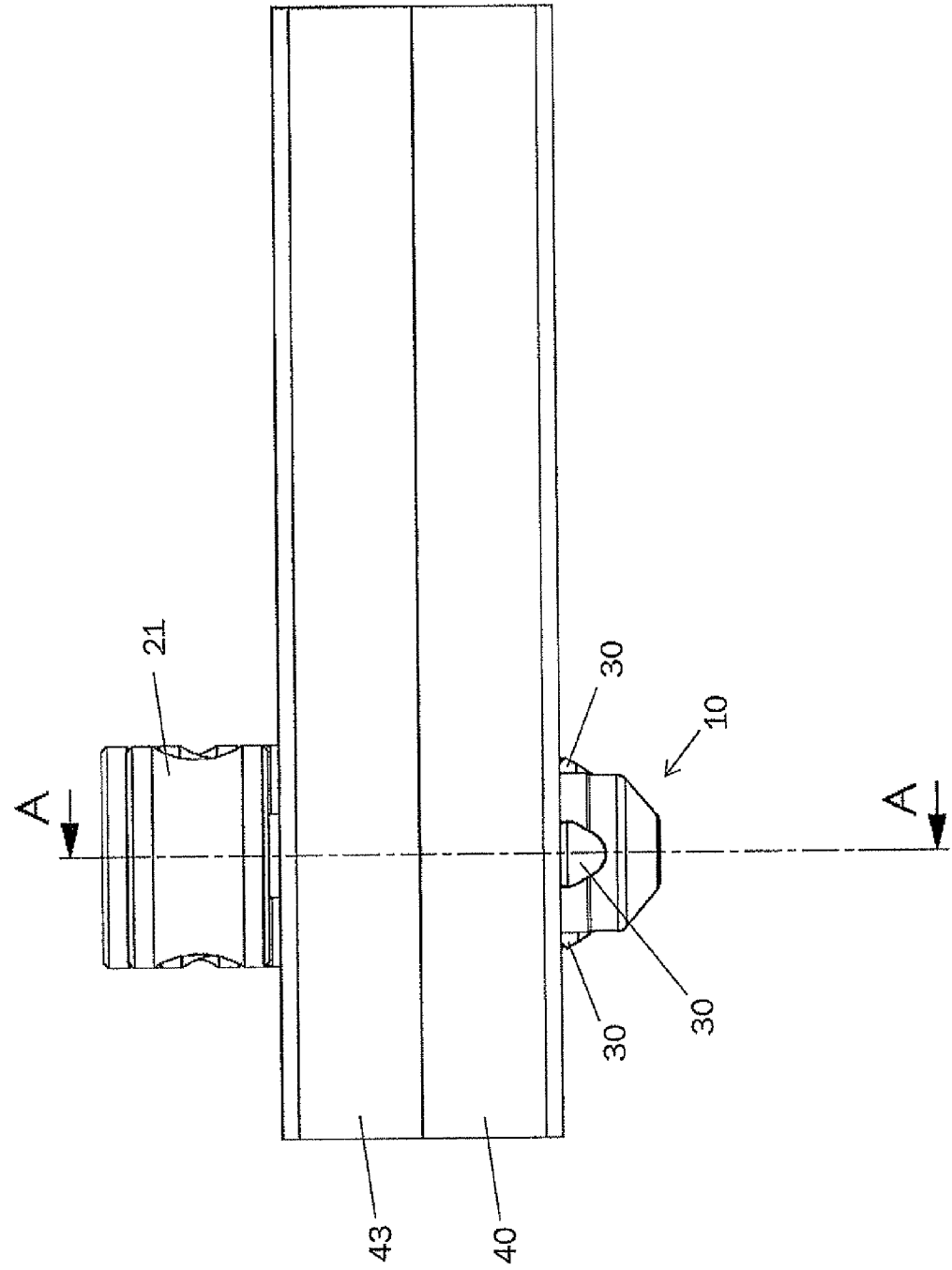
FIG. 2 shows a front view according to an exemplary embodiment of the present invention in the clamped state for the detachable connection of two component parts.

The functioning of the bolt 10 is now explained in more detail in the following figures. For example, FIG. 2 illustrates the use of the bolt for the detachable connection of a first component part 40 provided with at least one through-hole with a second component part 43 which is also provided with a through-hole. The bolt is simply inserted in two through-holes of the component parts 40, 43, which are aligned in single file and have the shape of a cylinder or an elongated hole. The sliding elements 30 are forced out of the through-openings by subsequent twist of the hand grip 21 and are interlocked behind the through-hole on the bottom side of the second component part 40. The hand grip 21 is here pulled through the threaded spindle towards the component part facing it and both components 40, 43 are clamped together.

The collar 15 defines the insertion depth of the bolt 10 when the bolt 10 is inserted in an elongated hole with standardized depth in such a way that clamping is immediately possible and the formerly necessary return stroke and retraction are avoided.

Figure 3:
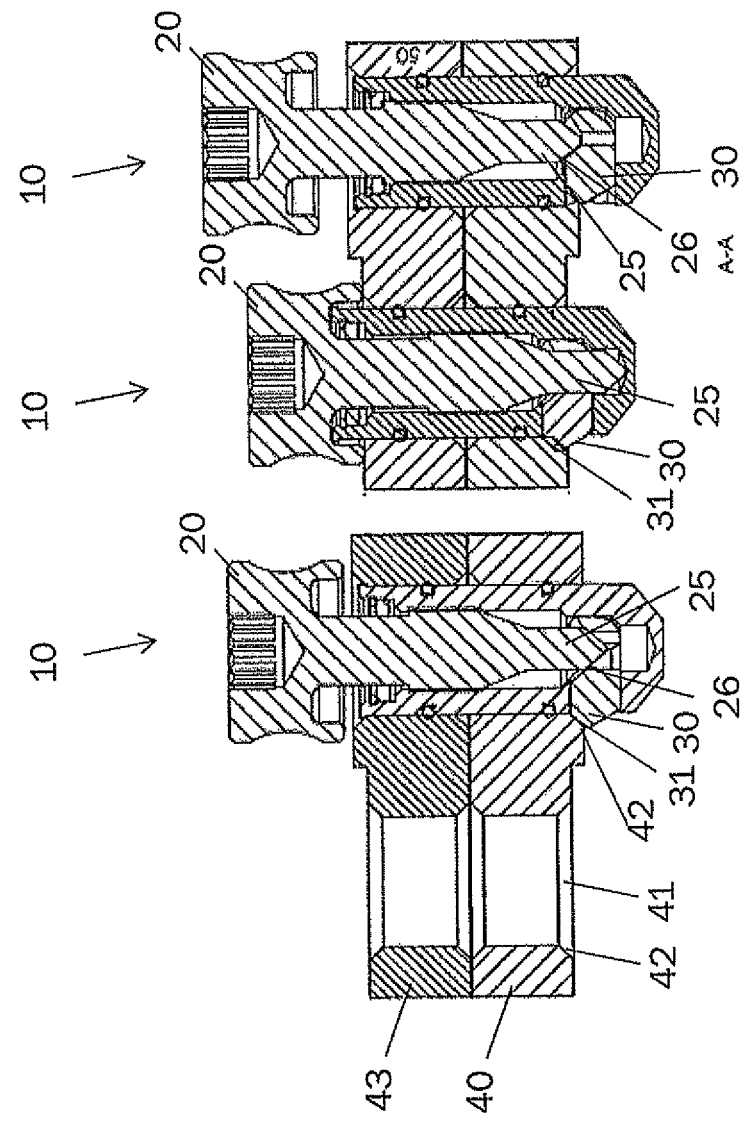
FIGS. 3A-3C show sectional views of various clamping states according to an exemplary embodiment of the present invention.

The various clamping states are illustrated in the sectional views of FIGS. 3A to 3C by way of diagram. Here, FIG. 3C shows the bolt 10 in an open position, wherein the spindle 20 is disposed in an unscrewed open position. In the open position, the sliding element 30 is inside the bolt housing 11 since the former is pushed into the housing interior on account of the chamfered second support surface 32 when the bolt 10 is inserted in the through-holes of the component parts 43 and 40. In this state, the tip 26 of the bolt does not yet exert a pushing force onto the sliding elements 30.

When the hand grip 21 of the spindle 20 is turned, the lower tapering section 26 of the spindle 20 successively forces the sliding elements 30 radially outwards, which is illustrated in FIG. 3A. FIG. 3B shows another exemplary embodiment of a clamp bolt having a smaller dimension, wherein the spindle 20 was turned in the lower end position and the forced-out sliding elements are interlocked in the depression 42 of the lower through-hole. In this position, the two component parts 40, 43 are firmly interlocked. In this position, the surface 31 forms a planar positive fit with a lateral area segment 42 of a frustoconical depression 41. This type of a frustoconical depression 41 with the lateral area segment 42 is shown once again in FIG. 3A for the purpose of clarification by means of the empty through-hole without bolts.

In the following, a further aspect of the invention (not shown in the figures) is described which relates to a method for locking and unlocking a clamp bolt by means of a tool for torque transmission. According to the method, a tool is used for torque transmission by means of which a clamp bolt 10 is locked and detached again. For this purpose, a tool is positioned on the clamp bolt 10 in such a way that it meshes in positive fit with an axial recess of the threaded spindle or an axial recess of an outwardly extending hand grip 21 or the like of the threaded spindle 20, and therefore the tool can transmit a torque to the spindle 20 of the clamp bolt 10. In the present exemplary embodiment, the hand grip 21 of the clamp bolt 10 is provided with an axial recess 22 which contains both an internal thread and a polygonal or torx recess. When the percussion drill meshes in positive fit with the recess 22, a torque for locking or releasing the bolt can be transmitted when the percussion drill is actuated. An advantage of this method is that a worker can fasten and/or release a plurality of bolts in a one-hand operation rapidly and with high clamping force.

Figure 4:
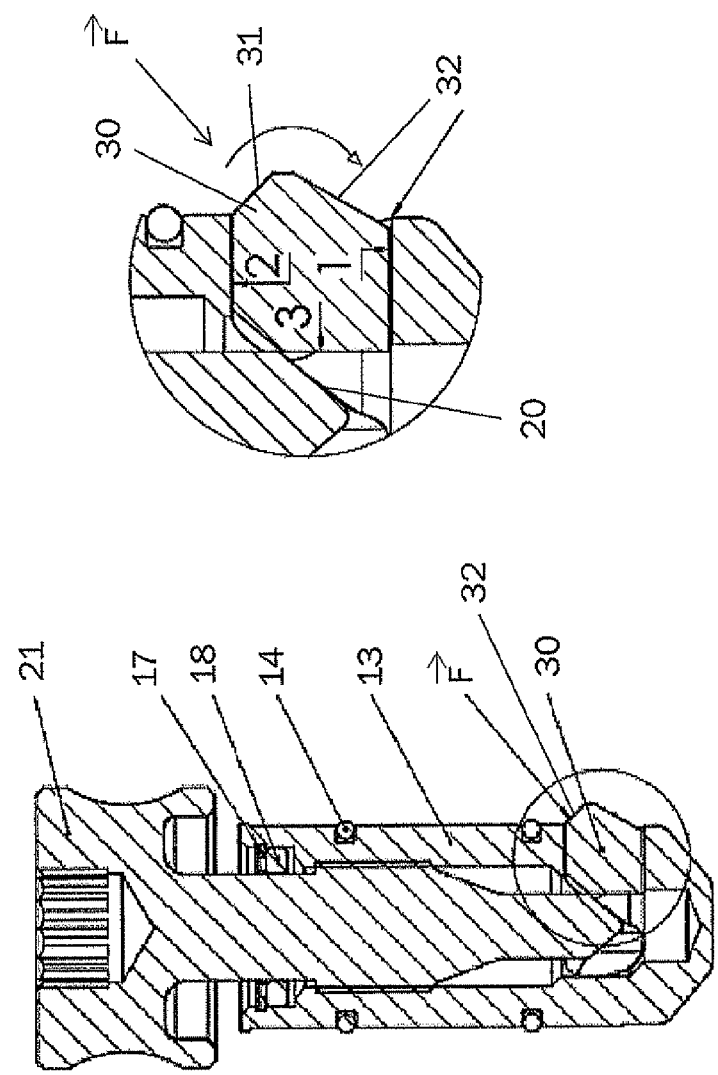
FIG. 4 illustrates by way of diagram the advantageous force application to the sliding elements according to an exemplary embodiment of the present invention.

FIG. 4 shows once again an enlarged view of the encircled region of the clamp bolt to better clarify the forces acting when a force is applied. A clamping force F is applied as a counterforce of the clamped component part via the support surface 31, which as shown in FIG. 3A forms a planar positive fit with a lateral area segment 42 of a frustoconical depression 41 in the clamped state. Since the sliding elements are supported with clearance in the through-opening of the bolt housing 11, the sliding element 30 is slightly twisted and interlocked when a force is applied. This, in turn, effects in the clamped state a tilting moment which has a very positive effect because the actual friction surface 3 where the sliding element is connected to the front tip 26 of the spindle 20 is thus only slightly loaded. When a force is applied via the support surface 31, the main forces are deflected to the lower and upper boundary surfaces 1 and 2 of the sliding element 30.

In the present exemplary embodiment, the support surface 31 has an angle of about 45° with respect to the bolt housing 11. Correspondingly, a force is also applied via this support surface 31 with an angle of 45° relative to the longitudinal axis of the bolt 10. This applied force thus first acts on the lower support surface 1 and is again supported via the upper boundary surface 2 since the sliding element 30 which is supported with a clearance of about 1/10 tries to twist on account of the force application. This effects tilting of the sliding element 30 predominantly on the contact surfaces 1 and 2. The remaining third force in the direction of the center 3 is thus strongly reduced. Under the influence of this residual force in the direction of the center 3, the sliding element moves in the direction of the center where it is blocked by the spindle end and a line contact is formed with the spindle. The tilting of the sliding element 30 on the support surfaces 1 and 2 produces a resistance. This resistance is advantageously increased by the high frictional forces created on contact surfaces 1 and 2 which are greater compared to the line contact 3. In other words, the force flow is produced by the tilting moment in such a way that the main clamping forces are applied to the upper and lower sides 1, 2 of the sliding element (upper and lower sides within the meaning of the longitudinal direction of the spindle), and therefore only very small forces act on the contact surface 3 along which the spindle 20 travels when driven. The relief of the middle spindle 20, which results from this tilt, also has the advantage that on account of the low friction occurring at the middle spindle, the latter can be detached and clamped "sensitively".

Such an advantageous tilting moment is not formed with spherical clamping devices since the introduced clamping force is passed on towards the center almost 1:1, and therefore a high pressing force is exerted on the inner expanding mandrel 26.

FIG. 5 again illustrates various clamping states of the bolt 10 in a perspective sectional view while FIG. 6 shows in a bottom view how the sliding elements 30 are forced out of the through-opening of the bolt housing 11 in the clamped state by the spindles and are interlocked behind the through-hole.

As mentioned above, the particularly advantageous force distribution enables the use of internal threads in the through-holes on account of the sliding elements having polygonal cross-section and a planar force deflection. For example, FIG. 7B illustrates a common D28 through-hole into which an M30 thread 44 is introduced. As a result of the use of additional adapter bushes 45 as shown in FIG. 7A, the through-hole for the clip bolt can rapidly be adapted to various thread requirements by introducing a suitable adapter bush 45, e.g. an M24, M20, M16 or M12 adapter bush, in which a threaded rod 46 can then be screwed, as shown in FIG. 7B.

The flexibility and possible applications of clamping systems of this type are thus significantly increased, which is illustrated in FIG. 8 by way of example. A first component part 40 is interlocked with a second component part by means of a clamp bolt 10 and simultaneously with a third component part 47 by means of a threaded rod 46. The diameter of the system bore for receiving the threaded rod is adapted to the diameter of the threaded rod 46 by means of an adapter bush 45 which is screwed into the internal thread 44 of the system bore. The system bores of the component parts 40, 43 also have an introduced internal thread 44, and therefore it is here also possible to use a threaded rod 46 instead of a bolt. The use of clamp bolts having spherical clamp devices would damage the notches of the internal thread 44 at the contact points 48 of the clamping devices with the component part 40. On account of the planar positive fit of the sliding elements 30 of the bolt 10, the occurring clamping force, will, however, be distributed sufficiently over the support surfaces so as to avoid damage of the thread 44.

FIGS. 9A-11C show further exemplary embodiments of the clamp bolt according to the invention. FIG. 9A shows a sectional view of a bolt 910A where the sliding elements 930A are supported in inclined fashion in the bolt housing. This figure and the subsequent figures only show one sliding element; the other sliding elements were each omitted to clearly show the design principle. When the spindle is screwed in the bolt housing, the sliding elements are forced out of the bolt housing by the spindle tip. The outer portion of the sliding element has the support surface 931A in the form of a lateral area segment of a truncated cone to form a planar contact with the chamfered through-hole. The bolt shown in FIG. 9B differs from the bolt in FIG. 9A in that the outer portion of the sliding element 930B has an annular support surface 931B so that in a non-chamfered through-hole the bolt can have a planar contact to the counter-part in the clamped state.

In the exemplary embodiment illustrated in FIG. 10A, the clamping device is made as a stud 1020 which is disposed in the bolt housing and can be tightened by means of an Allen wrench, for example. At the end of the stud 1020 there is a ball 1021 which transmits the clamping force of the stud to the sliding elements 1030A. The use of a ball 1021 enables a punctiform contact to the stud 1020 and to the sliding element 1030A, and therefore the frictional forces occurring are advantageously reduced. The exemplary embodiment shown in FIG. 10B in turn differs from the bolt in FIG. 10A by the annular surface 1031B of the sliding element 1030B for use in non-chamfered through-holes while the bolt in FIG. 10A has a support surface 1031A in the form of a lateral area segment of a truncated cone to form a planar contact with the chamfered through-hole.

At the bolt head, the bolt 1110A shown in FIG. 11A has an additional thread 1111 at the bolt housing to adapt the bolt to various plate strengths. This has the advantage that plates of different thicknesses can be clamped. Similar to the bolt in FIG. 10A, the clamping device is made as a stud 1020 in the bolt housing with the ball 1021, the difference being that sliding elements are used, as described in FIG. 13. In contrast to the bolt 1110A, the bolt 1110E shown in FIG. 11B has no thread 1111. The bolt 1110C shown in FIG. 11C differs from the bolt 1110B in that the stud 1020C directly abuts against the sliding element 30.

Here, the sliding elements protrude from the housing at an angle of about 45° relative to the longitudinal axis of the bolt, wherein the clamping device is made at least as one sliding element (30) supported in rotationally fixed fashion in the bolt housing and the outer portion of the sliding element (30) has a support surface (31) in the form of a lateral area segment of the truncated cone or an annular support surface.

A further advantageous exemplary embodiment of the bolt is shown in the sectional views of FIGS. 12A and 12B. The bolt shown has an additional snap-ring 1201 for securing the sliding element 30. For this purpose, the sliding element has a circumferential edge 1202. When the bolt is clamped, a sliding element 30 can protrude from the through-hole at the most up to the position where the circumferential edge 1202 of the sliding element abuts against the snap-ring 1201. Thus, the snap-ring secures the sliding elements against falling out of the through-opening.

Thus, upsetting or stamping of the bolt housing 11 can be prevented at the lower region of the through-openings for the sliding elements 30. This facilitates the production of a reliable safeguard of the sliding elements 30 since an upsetting of the housing can result in a greater amount of rejects during the production in connection with production tolerances occurring.

The snap-ring 1201 also enables a cleaning of the bolt should the interior of the latter be soiled by soot or other particles and could impair the movement of the sliding elements. For this purpose, the snap-ring 1201 can be removed to take the sliding elements out of the bolt 1210 and clean the through-openings for receiving the sliding elements 30. This is not possible in the exemplary embodiment of the upset through-opening. A further O-ring 1203 in the interior of the bolt 1210, which surrounds the tapering tip 26 of the spindle, prevents dirt from the through-opening of the sliding elements 30 from reaching the upper part of the bolt.

The individual features of the invention are, of course, not limited to the described combinations of features within the scope of the presented exemplary embodiments and can be used according to predetermined apparatus parameters in other combinations as well.

The invention claimed is:

1. A bolt for a detachable connection of two component parts provided with at least one through-hole, comprising:
   a bolt housing having through-openings for clip means;
   a clip which is supported in the through-openings of the bolt housing; and
   a clamping device which is arranged in an interior of the bolt housing and is provided with an external thread, the external thread meshes with an internal thread of the bolt housing and which, during clamping, forces the clip out of the bolt housing in such a way that an outer portion of the clip protrudes from the through-openings,
   wherein the clip means is at least one sliding element supported in the bolt housing in a rotationally fixed fashion and an outer portion of the at least one sliding element has a support surface in a form of a lateral area segment of a truncated cone or an annular support surface, and wherein
   a cross-section of the at least one sliding element in a radial direction of the at least one sliding element has a shape of a triangle with rounded corners.

2. The bolt according to claim 1, wherein the support surface is shaped so as to form a planar positive fit with a counter-part to be clamped.

3. The bolt according to claim 1, wherein the at least one sliding element has a polygonal cross-section.

4. The bolt according to claim 1, wherein the at least one sliding element is supported with clearance in the through-openings, wherein an application of force via the support surface effects clamping of the at least one sliding element.

5. The bolt according to claim 1, wherein the clamping device is a spindle having a tapering end region, wherein the tapering end region forces the at least one sliding element out of the bolt housing when the spindle is screwed in.

6. The bolt according to claim 1, wherein a ball is supported in the interior of the bolt housing wherein a clamping force of the clamping device is transmitted to the at least one sliding element via the ball.

7. The bolt according to claim 1, wherein the bolt comprises three sliding elements which are supported concentrically in three bores at a distance of about 120°.

8. The bolt according claim 1, wherein a first end region of the clamping device protrudes from the bolt housing and the bolt housing has a circumferential edge at an end thereof where the first end region of the spindle protrudes from the bolt housing.

9. The bolt according to claim 1, wherein the bolt housing has one circumferential groove each in its upper and lower portions, said circumferential groove being provided with a rubber ring or a steel snap-ring.

10. The clamping system for the detachable connection of two component parts having a bolt; comprising:
   a bolt according to claim 1;
   a threaded rod;
   first and second component parts each having at least one standardized through-opening which has a shape of a circle or of an elongated hole and into which a standardized internal thread is introduced,
   wherein the two component parts can be connected by both inserting the bolt in the through-openings of the component parts and subsequently clamping the bolt and screwing the threaded rod in the through-openings.

11. The clamping system according to claim 10, further comprising at least one adapter threaded bush for reducing a thread diameter, said bush being adapted to be screwed in the internal thread of the through-opening of the component parts.

12. A bolt for a detachable connection of two component parts provided with at least one through-hole, comprising:
   a bolt housing having through-openings for clip means;
   a clip which is supported in the through-openings of the bolt housing; and
   a clamping device which is arranged in an interior of the bolt housing and is provided with an external thread, the external thread meshes with an internal thread of the bolt housing and which during clamping forces the clip out of the bolt housing in such a way that an outer portion of the clip protrudes from the through-openings,
   wherein the clip is at least one sliding element supported in the bolt housing in a rotationally fixed fashion and an outer portion of the at least one sliding element has a support surface in a form of a lateral area segment of a truncated cone or an annular support surface, and
   wherein the bolt housing has one circumferential groove each in its upper and lower portions, said circumferential groove being provided with a rubber ring or a steel snap-ring.

13. A clamping system for a detachable connection of two component parts having a bolt, the clamping system comprising:
   the bolt for the detachable connection of two component parts provided with at least one through-hole, comprising:
      a bolt housing having through-openings for clip means;
      a clip which is supported in the through-openings of the bolt housing; and
      a clamping device which is arranged in an interior of the bolt housing and is provided with an external thread, the external thread meshes with an internal thread of the bolt housing and which during clamping forces the clip out of the bolt housing in such a way that an outer portion of the clip protrudes from the through-openings, and
      wherein the clip is at least one sliding element supported in the bolt housing in a rotationally fixed fashion and an outer portion of the at least one sliding element has a support surface in a form of a lateral area segment of a truncated cone or an annular support surface;
   a threaded rod;
   first and second component parts each having at least one standardized through-opening which has a shape of a circle or of an elongated hole and into which a standardized internal thread is introduced,
   wherein the two component parts can be connected by both inserting the bolt in the through-openings of the component parts and subsequently clamping the bolt and screwing the threaded rod in the through-openings.

* * * * *